United States Patent
Bales

[11] Patent Number: 5,833,424
[45] Date of Patent: Nov. 10, 1998

[54] ROUND HAY BALE LIFTER

[76] Inventor: Jerry L. Bales, P.O. Box 377, Hico, Tex. 76457

[21] Appl. No.: 935,548

[22] Filed: Sep. 23, 1997

[51] Int. Cl.⁶ ..................................................... B60P 1/64
[52] U.S. Cl. .......................................... 414/24.5; 414/912
[58] Field of Search ................................... 224/519, 521; 414/24.5, 24.6, 685, 912, 920

[56] References Cited

U.S. PATENT DOCUMENTS

| | | | |
|---|---|---|---|
| 4,256,426 | 3/1981 | Buss | 414/24.5 |
| 4,412,768 | 11/1983 | Bauer et al. | 414/24.5 |
| 4,556,358 | 12/1985 | Harlan | 414/550 |
| 4,674,933 | 6/1987 | Brown | 414/24.6 |
| 4,710,090 | 12/1987 | DeLuca et al. | 414/550 |
| 4,911,596 | 3/1990 | Fetter | 414/24.5 |
| 5,106,253 | 4/1992 | Wedin | 414/24.5 |
| 5,211,526 | 5/1993 | Robinette | 414/550 |
| 5,603,597 | 2/1997 | Clay, Sr. | 414/24.5 |
| 5,651,653 | 7/1997 | Bablo | 414/24.5 |

Primary Examiner—Janice L. Krizek
Attorney, Agent, or Firm—Dennis T. Griggs

[57] ABSTRACT

A hand operated hay bale lifter is of a size and weight that can be handled by one person and includes a square coupling bar that can be quickly and easily inserted into the receiver pocket of a standard tow bar trailer hitch. Mechanical lifting force produced by a hydraulic jack assembly is transferred to a fork assembly through a contact coupling provided by an open bearing cup or socket mounted on the fork assembly. The hydraulic jack assembly includes a hand pump, a hydraulic power cylinder and a piston rod mounted on an outboard support stub. The bearing cup or socket rotates in sliding engagement against the piston rod during extension and retraction. Because the piston rod and fork assembly are coupled by contact engagement only, the fork assembly can be quickly elevated by hand and locked in an upright travel/storage position.

20 Claims, 4 Drawing Sheets

ROUND HAY BALE LIFTER

BACKGROUND OF THE INVENTION

This invention relates generally to farm and ranch equipment, and in particular to fork lift devices that can be installed on pick-up trucks, sport utility vehicles and the like.

Forage crops for feeding livestock are grown intensively with multiple cuttings per year, and include three major groups of fodder: grasses, including cereals that are harvested green; legumes that are harvested green; and root crops that are cultivated for fodder. All three types are fed to farm animals, either as green feed, as hay that is harvested dry or dried after harvesting, or as silage products.

Legumes including clover and alfalfa are in widespread cultivation as a green fodder for hay or silage. With good management, annual yields of 3–4 tons per acre of alfalfa hay can be harvested, with 4 or 5 cuttings per season, and the time period between cuttings usually averaging from 30–40 days. After the hay is cut, it is compressed into small rectangular bales for indoor storage or rolled into relatively large round bales measuring 5–6 feet in diameter. The round bales may weigh as much as 1,000 to 1,500 lbs. and measure 5–6 feet in length.

Typically, the round bales are left in the field for drying, but are removed from the field before the next cutting. Because of their considerable mass and volume, the round bales cannot be handled manually, and power lift equipment is necessary for lifting, transporting and off-loading the bales.

Tractors equipped with hydraulic forklifts are available for short haul transport jobs, for example moving the round bales into neighboring grazing pastures. However, forklift tractors are not suited for long haul travel, for example several miles over paved highways, because of speed and stability limitations. Consequently, pick-up trucks and sport utility vehicles have been modified with hydraulic forklift equipment for lifting, transporting and off-loading the round hay bales for both short haul and long haul jobs.

One limitation on the use of such equipment is the expense and complexity of mechanically retrofitting the power lift equipment and connecting to on-board hydraulic or electrical systems that may not have reserve capability. Such retrofit arrangements generally require one person to operate the vehicle and another person to operate the hydraulic lift equipment. Moreover, conventional pick-up trucks and sport utility vehicles must be modified substantially to accommodate power lift equipment. Such permanent installations cannot be quickly connected or disconnected and must remain on the vehicle after the job is done, thus interfering with tail gate operation and utilization of the rear deck cargo space.

On many occasions, a farmer or rancher is faced with both short haul and long haul transport jobs, particularly where one herd of farm animals are grazed nearby, and other herds are grazed several miles away, for example on leased pastures. Additionally, many small operators keep only a few head of stock and thus require only a few bales per year. Such operators are not likely to own a tractor forklift and must pay premium prices for small order delivery.

Pick-up trucks and sport utility vehicles are commonly equipped with a rear bumper and a square tow bar trailer hitch which is secured beneath the bumper to the underside of the vehicle frame. Forklift devices have been devised for attachment to the rear bumper or to the tow bar hitch for lifting, transporting and off-loading round hay bales, for example as shown in U.S. Pat. No. 5,603,597, U.S. Pat. No. 4,412,768 and U.S. Pat. No. 4,674,933.

In U.S. Pat. No. 5,603,597, a forklift is pivotally attached to a tow bar on a pick-up truck, and the forklift is elevated by a manually operated ratchet binder draw bar. Because of the length of the ratchet binder draw bar arrangement, the bale remains separated from the rear end of the vehicle by a considerable distance when it is in the fully retracted and elevated position, thus shifting the center of gravity of the loaded vehicle toward the rear axle. The handling of heavy bales can lead to bouncing and upending of the vehicle, thus limiting the speed at which it can be safely operated.

The stability problem is minimized by the bumper mounted power lift structure shown in U.S. Pat. No. 4,412,768. However, the hydraulic cylinder and piston extend below the wheel axle, thus exposing the lift assembly to structural damage when the rear suspension bottoms out and permits the lift equipment to drag against the road surface. A further limitation on the power lift apparatus shown in U.S. Pat. No. 4,412,768 is that the hydraulic power cylinder must be connected to the vehicle hydraulic system, and the rear bumper must be removed and replaced by a custom made bumper.

Likewise, the rear bumper of the power lift apparatus shown in U.S. Pat. No. 4,674,933 must be removed and replaced by a tubular bumper having a rotatable member that is coupled to a hydraulic cylinder. The hydraulic cylinder of U.S. Pat. No. 4,674,933 also projects into the space beneath the load frame, and derives its operating power from the hydraulic system of the vehicle.

Accordingly, there is a continuing interest in providing an improved hay bale lifter that can be quickly and easily installed on a conventional tow bar trailer hitch by a single person, that can be manually operated without connection to the vehicle hydraulic or electrical systems, with no portion of the hay bale lifter extending below the tow bar coupling, and with the installation, operation and removal of the hay bale lifter being performed by one person without the use of tools.

BRIEF SUMMARY OF THE INVENTION

A completely passive, hand operated hay bale lifter includes a rotatable fork assembly, a hand operated hydraulic jack and a coupling bar configured for insertion into the receiver pocket of a tow bar trailer hitch mounted on the load frame of a pick-up truck or sport utility vehicle. The fork assembly includes an impaling end portion and a hinge end portion supported on the coupling bar for pivotal movement to and from an unloaded resting position in which the impaling end portion extends generally horizontally for impaling a bale of hay, and to and from an inclined position in which the impaling end portion is elevated with respect to the hinge portion. The hydraulic jack assembly includes an extendable piston rod and a hand operated pump that is supported by the coupling bar beneath the fork assembly. An open bearing cup is mounted on the underside of the fork assembly for engaging the piston rod, and the piston rod supports the fork assembly and impaled load during extension and retraction of the piston rod relative to the power cylinder.

Hydraulic lifting power is provided by the manually operated pump that forms a part of the hydraulic jack assembly. Consequently, only a mechanical coupling connection to the vehicle is required, which in the preferred embodiment is a standard square-type tow bar trailer hitch which is attached to the load bearing frame below the rear bumper of the vehicle. A mechanical lifting force produced by the hand operated pump and hydraulic jack is transferred to the fork assembly through a contact coupling between the piston rod and an open bearing cup or socket mounted on the fork assembly. The bearing cup or socket rotates in sliding engagement against the piston rod during extension and retraction. Because the piston rod and fork assembly are coupled only by contact engagement, the fork assembly can be quickly lifted by hand and locked in an upright travel/storage position, without the use of tools.

The fork assembly includes a pivot frame pivotally mounted on an upright yoke weldment, thereby positioning the fork assembly directly above the hydraulic cylinder and piston rod. According to this arrangement, the fork assembly is supported in a generally horizontal orientation by the hydraulic power cylinder and piston rod while a bale is being impaled, and the full mechanical advantage provided by the hydraulic power cylinder is utilized as the impaled bale is elevated.

The placement of the hydraulic power cylinder reduces the shift in the vehicle's center of gravity imposed by the impaled load. Moreover, none of the lift equipment extends below the vehicle rear axle, thus avoiding dragging damage. Since the pump is manually operated, there are no connections required with the vehicle hydraulic or electrical systems. This arrangement also makes it possible to quickly remove the hay bale lifter from the vehicle when full access to the vehicle rear deck or rear load compartment is desired.

DETAILED DESCRIPTION OF THE INVENTION

Figure 1:
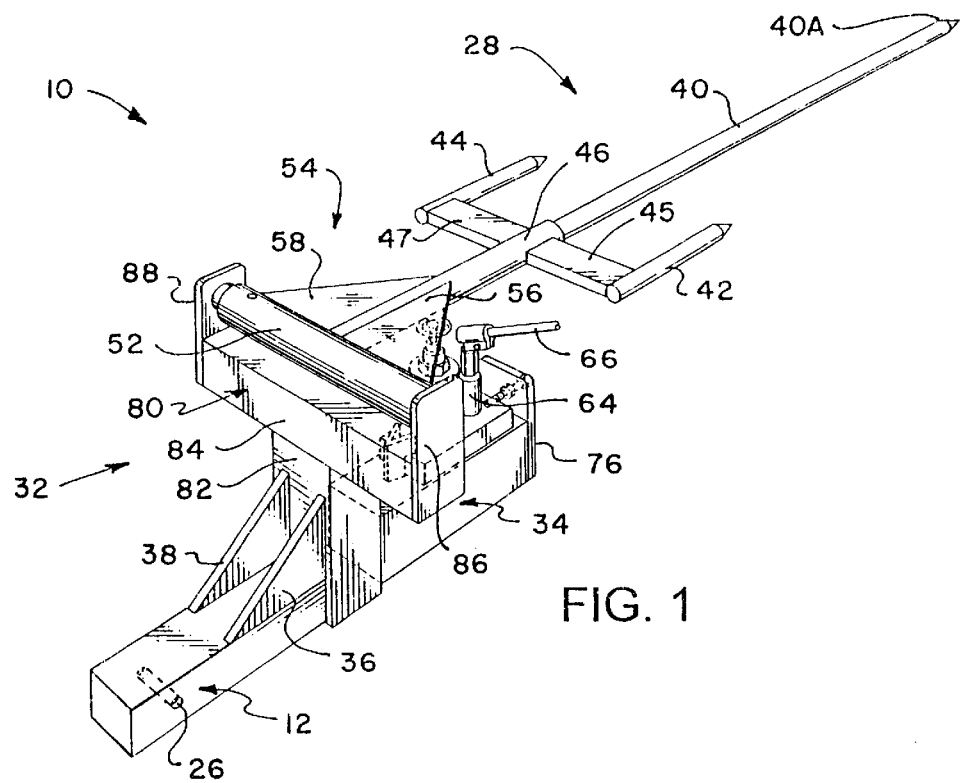
FIG. 1 is a top rear perspective view of the manually operated hay bale lifter of the present invention.

In the description which follows, like parts are indicated throughout the specification and drawings with the same reference numerals, respectively. The figures are not necessarily drawn to scale and the proportions of certain parts have been exaggerated for sake of clarity.

Referring now to FIG. 1–FIG. 6, a manually operated hay bale lifter 10 includes a coupling bar 12 made of two inch square steel stock that is configured for insertion into the receiving pocket 14 of a conventional square tow bar trailer hitch 16. The tow bar trailer hitch 16 is welded to a cross beam 18 that is secured by bolt fasteners to the load frame of a vehicle 22, for example a pick-up truck or sport utility van (½–1 ton). The coupling bar 12 is dimensioned for quick insertion into and withdrawal from the receiver pocket 14. The coupling bar 12 is locked in the fully inserted position by a lock pin 23 that projects through preformed holes 24, 26 that intersect the sidewall of the tow bar trailer hitch 16 and the coupling bar 12, respectively.

Other principal components of the hay bale lifter 10 include a fork assembly 28, a hydraulic jack assembly 30, a pivot stand 32 and a support stub 34. The coupling bar 12, the pivot stand 32 and the support stub 34 are welded together, with the pivot stand situated between the coupling bar 12 and the support stub 34, and projecting upright substantially at a right angle with respect to the coupling bar 12. Additionally, the stub 34 is welded onto the pivot stand 32, and functions as a cantilever support beam that projects outwardly and generally in alignment with the coupling bar 12. The welded union of the coupling bar 12 with the pivot stand 32 is reinforced by a pair of gusset plates 36, 38.

The fork assembly 28 includes a middle spike or lance 40 having a pointed end portion 40A. A pair of side spikes 42, 44 are mounted on a coupling barrel 46 and are laterally offset from the middle spike 40. The side spikes 42, 44 are secured in parallel offset alignment with the coupling barrel 46 by wing plates 45, 47, respectively. The middle spike 40 is inserted into the coupling barrel 46 and is releasably locked in the fully inserted position by a movable coupling pin 48.

Figure 2:
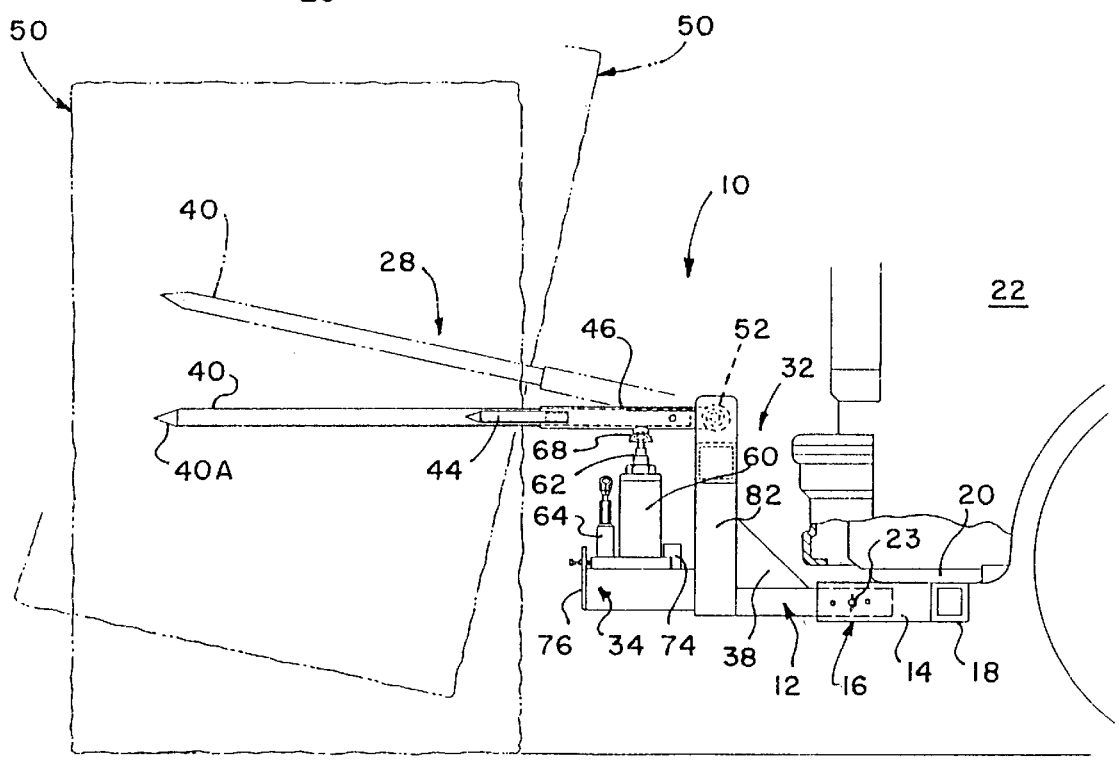
FIG. 2 is a side elevational view, partially broken away, showing the hay bale lifter installed on the tow bar trailer hitch of a vehicle, with the fork assembly impaled into a round hay bale.
Figure 3:
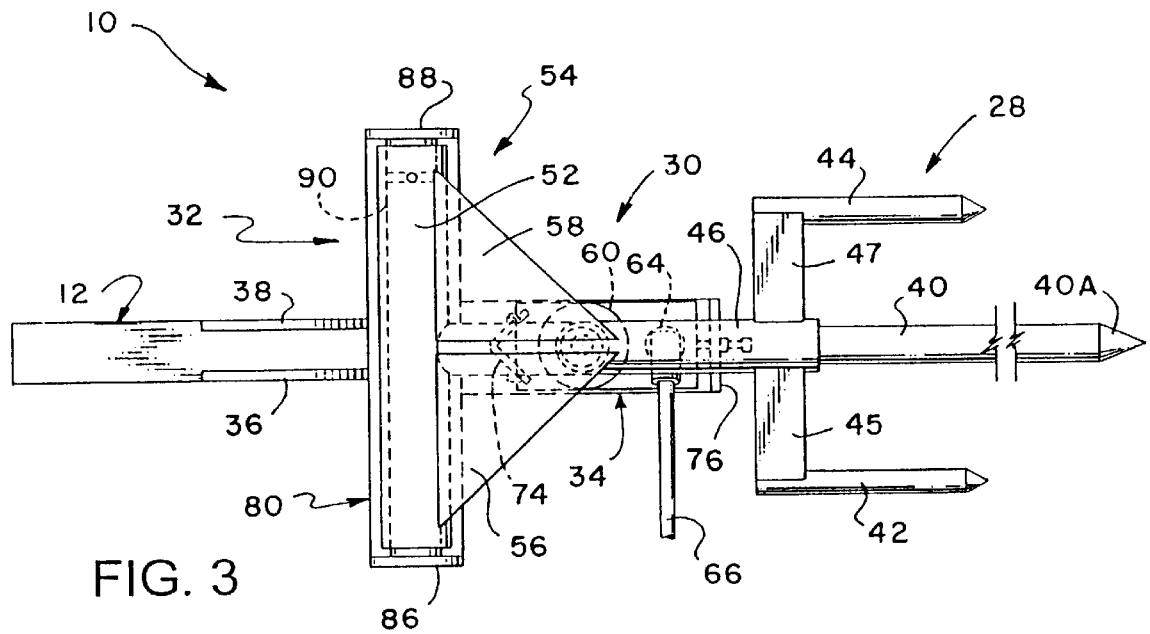
FIG. 3 is a top plan view thereof, with the fork assembly extending in the horizontal impaling position.

The fork assembly includes an impaling end portion provided by the pointed end 40A of the spike 40. As can be seen in FIG. 2, the middle spike 40 penetrates through the center of a round hay bale 50, while the side spikes 42, 44 penetrate into laterally opposite sides of the bale, thus stabilizing the bale 50 as it is elevated from the ground surface.

Figure 4:
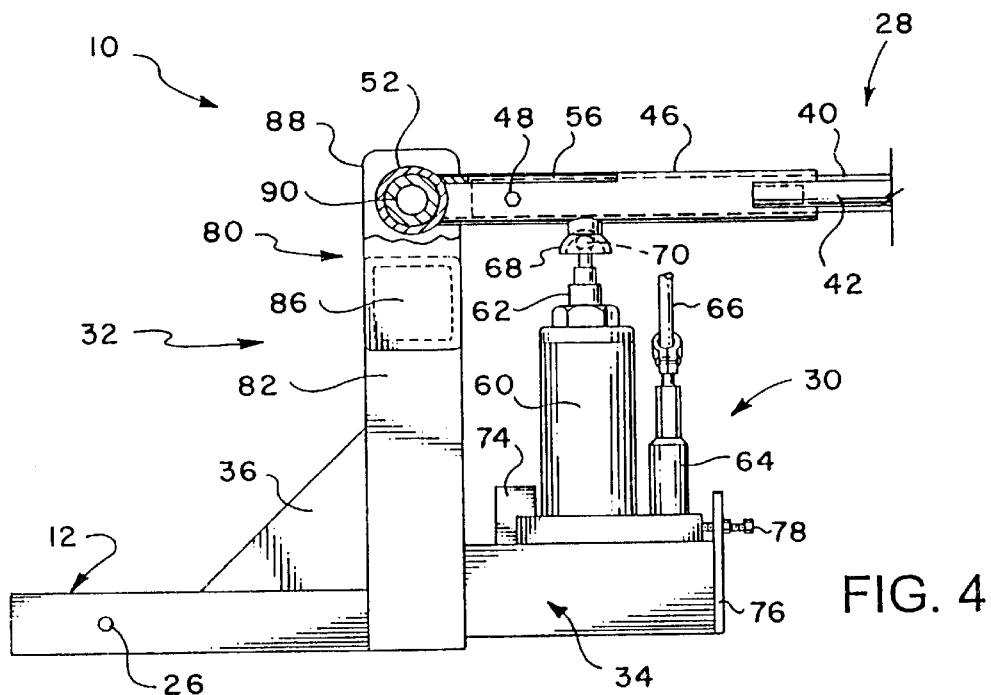
FIG. 4 is a right side elevational view thereof, partially broken away and partially in section.
Figures 7, 8:
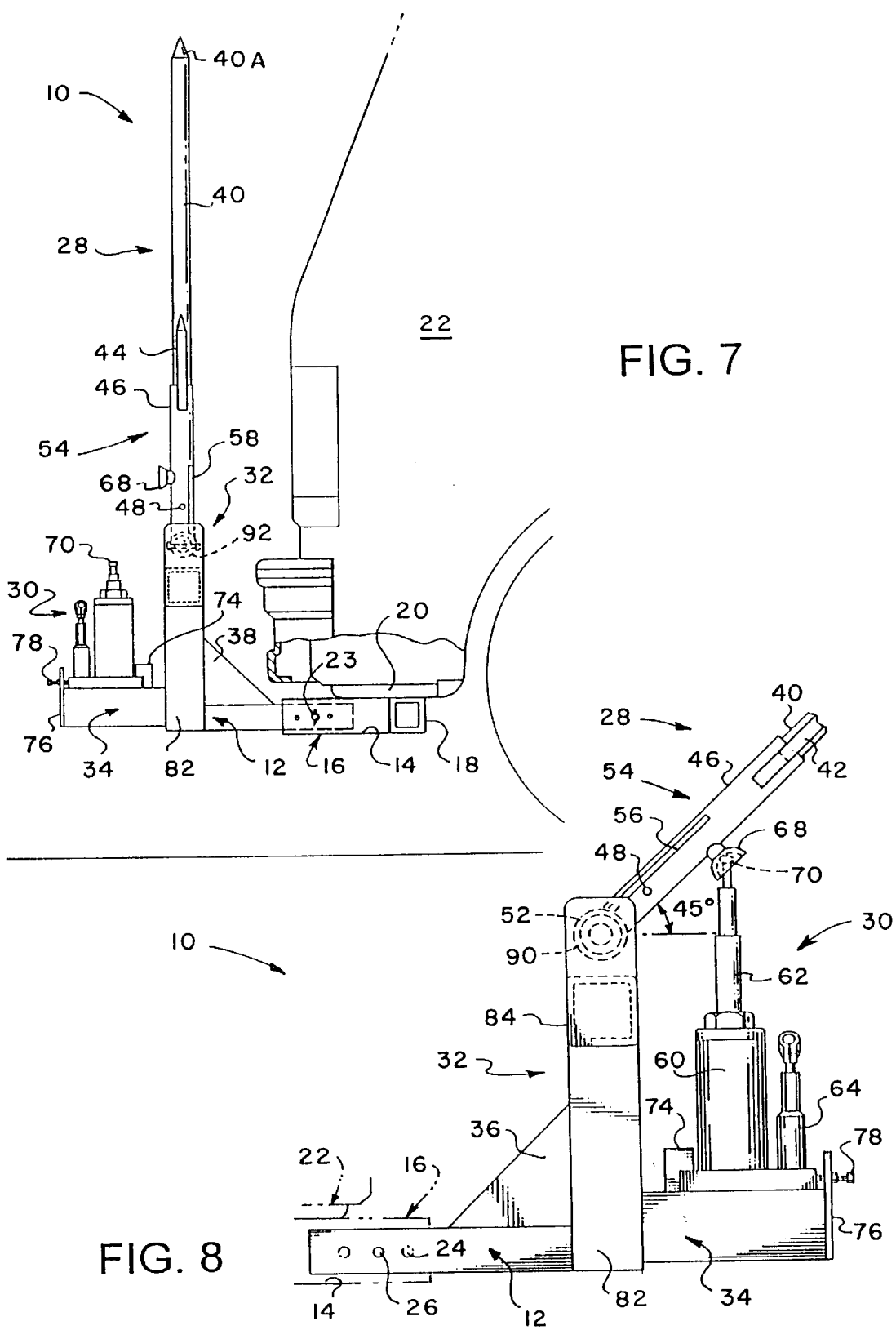
FIG. 7 is a side elevational view showing the hay bale lifter mounted onto the tow bar trailer hitch of a sport utility vehicle, with the fork assembly fully retracted and locked in the upright travel position; and, FIG. 8 is a side elevational view thereof, partially broken away, showing contact coupling engagement of the piston rod within a concave socket when the fork assembly is elevated to the load transport position.

The fork assembly 28 further includes a hinge end portion provided by a cylindrical bearing sleeve 52 supported by the coupling bar 12 for pivotal movement to and from a horizontal resting or impaling position, as shown in FIG. 2 and FIG. 4. In the horizontal position, the fork assembly projects outwardly for impaling the bale of hay 50, and is movable to and from an inclined position in which the impaling end portion 40A is elevated with respect to the hinge portion 52, as shown in FIG. 7 and FIG. 8. The fork assembly 28 includes a pivot frame weldment 54 formed by the welded interconnection of the cylindrical bearing sleeve 52, the coupling barrel 46 and a pair of triangular gusset plates 56, 58.

Referring now to FIG. 2 and FIG. 4, the hydraulic jack assembly 30 includes a hydraulic power cylinder 60, a piston rod 62 that is extendable and retractable within the power cylinder, a hand operated pump 64 and a pump handle 66. The hydraulic jack assembly 30 is of conventional design, in which the pump 64 is operated by reciprocating the pump handle 66 up and down. The pump 64 includes a hydraulic reservoir coupled via a check valve into a pressure chamber within the power cylinder 60, so that in response to each power stroke of the pump handle 66, the pump draws hydraulic fluid from the reservoir and forces it into the pressure chamber, thus extending the piston rod 62.

Figure 5:
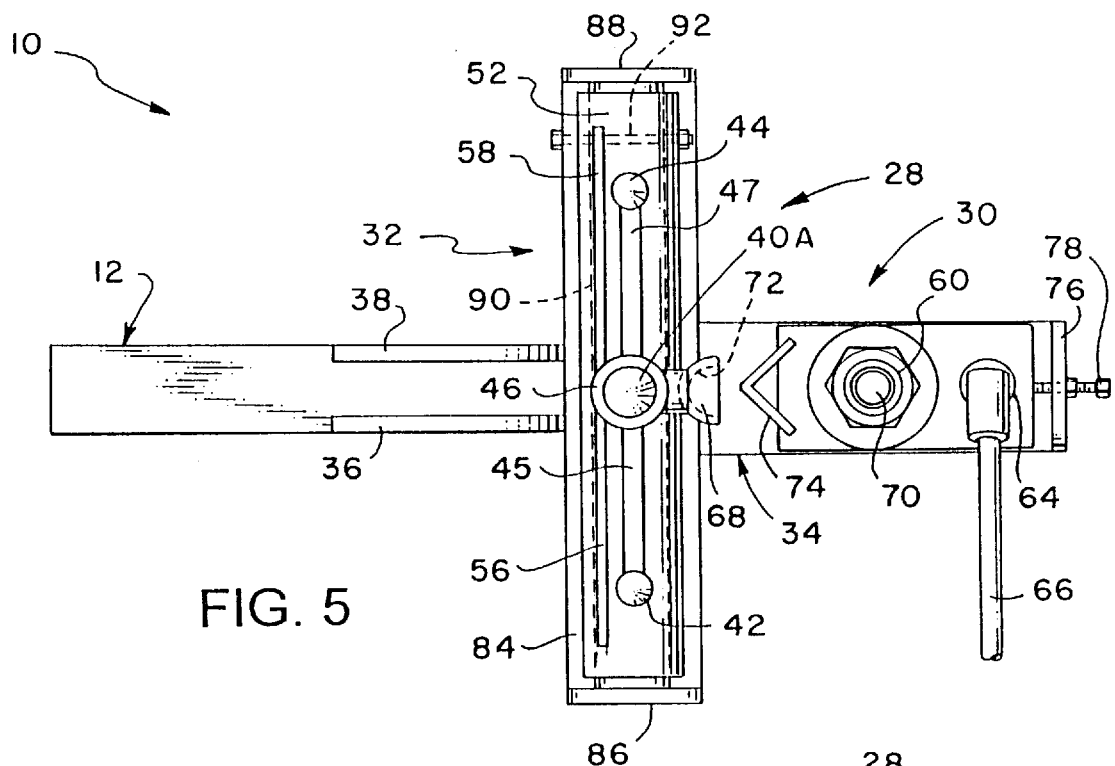
FIG. 5 is a top plan view thereof, with the fork assembly fully retracted and locked in the upright travel position.

According to an important feature of the invention, the mechanical lifting force produced by the hydraulic jack assembly is applied to the fork assembly 28 through a contact coupling formed between the piston rod 62 and an open bearing cup or socket 68 that is welded to the underside of the spike barrel 46. The piston rod includes an end portion 70 preferably in the form of a ball for insertion into a concave pocket 72 formed within the bearing cup 68. According to this arrangement, the bearing cup or socket 68 rotates in frictional engagement against the piston rod end portion 70 during extension and retraction. Because the piston rod 62 and the fork assembly 28 are coupled only by contact engagement between the ball 70 and the open cup 68, the fork assembly 28 can be quickly lifted by hand and locked in an upright travel/storage position, without the use of tools, as shown in FIG. 5 and FIG. 7.

Figure 6:
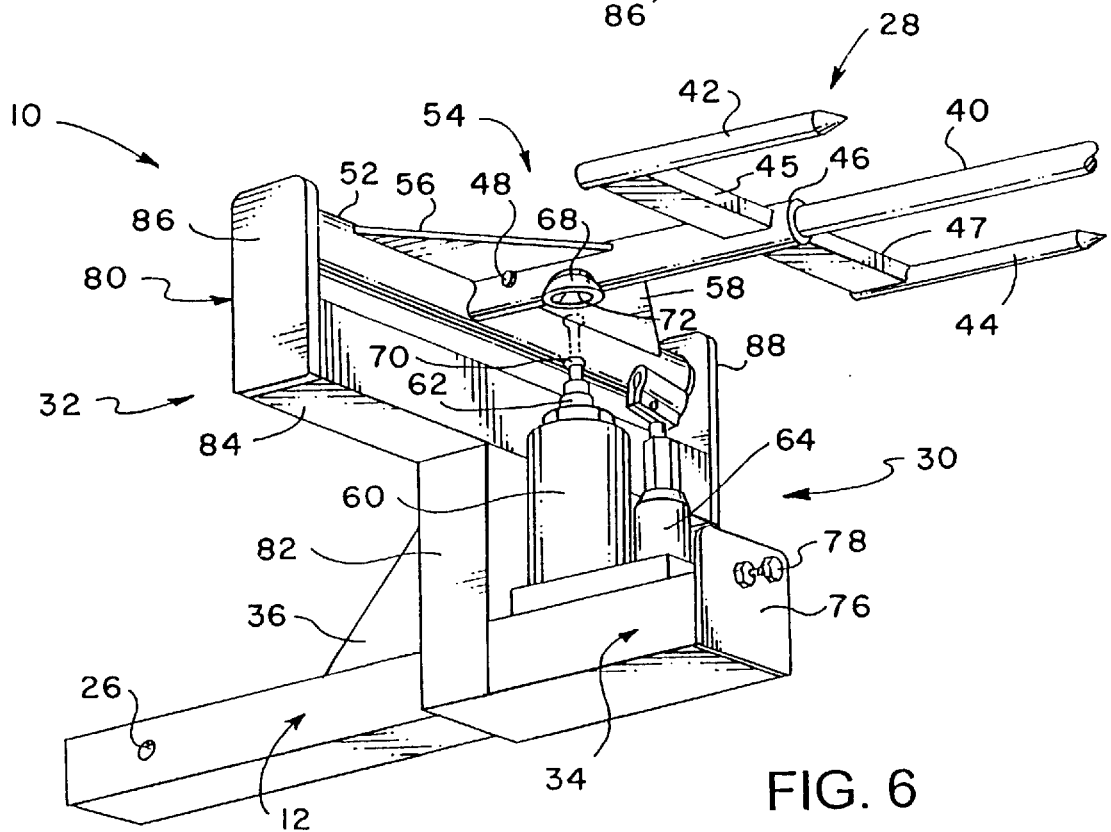
FIG. 6 is a front, underneath perspective view thereof.

Referring now to FIG. 4, FIG. 6 and FIG. 8, the support stub 34 is connected in cantilever relation onto the pivot stand 32, and projects outboard generally in alignment with the coupling bar 12. The hydraulic jack assembly 30 is mounted on top of the support stub 34, with the piston rod 62 located directly beneath the bearing cup 68 and fork assembly 28. The outboard placement of the hydraulic power cylinder 60 and the pivotal coupling of the fork assembly 28 on the pivot stand 32 reduces the shift in the vehicle center of gravity that is imposed by the impaled load.

The hydraulic jack assembly 30 is also advantageously positioned on top of the support stub 34 with the pump handle 66 projecting substantially at a right angle with respect to the support stub, thus providing convenient access to an operator for applying up and down pumping movement. Preferably, the hydraulic jack assembly 30 is compressed and captured between an angle bracket 74 and an end plate 76. The hydraulic jack assembly 30 is locked against the angle bracket in the operative position on the support stub 34 as shown in FIG. 6 by a threaded torque screw 78.

Referring again to FIG. 1, FIG. 2, FIG. 3 and FIG. 4, the pivot stand 32 includes a yoke weldment 80 formed by the welded interconnection of a stanchion 82 disposed upright between the coupling bar 12 and the support stub 34, a cross beam 84 mounted on top of the stanchion 82 and extending substantially at a right angle with respect to the coupling bar 12, a first end plate 86 and a second end plate 88 attached on opposite ends of the cross beam 84, and a cylindrical axle 90 supported on and extending between the first and second end plates 86, 88, respectively. As can best be seen in FIG. 4, the cylindrical axle 90 is received within the bore of the cylindrical hinge sleeve portion 52.

According to this arrangement, the axle 90 and the hinge sleeve 52 extend across the yoke space bounded by the cross beam 84 and the end plates 86, 88. The fork assembly 28 is thus capable of continuous pivotal movement substantially from a horizontal position in which it is supported by the piston rod 62 to a fully retracted, upright position as shown in FIG. 5 and FIG. 7. Referring to FIG. 5, the fork assembly 28 is locked in the upright vertical position for travel or storage by a lock pin 92.

The coupling bar 14 is preferably made of solid steel bar stock, having dimensions of 2"×2"×9". The gusset plates 36, 38 and 56, 58 are formed of quarter inch plate, A-36 grade carbon steel. The support stub 34 is formed of 3"×3"×8" tube steel, and the stanchion 82 is formed of 3"×3" by 12" tube steel. The cross beam 84 is constructed of 3"×3"×16" tube steel, and the end plates 86, 88 are constructed of ¼ plate steel having a dimension of about 3"×6". The spike coupling barrel 46 is formed of a 12" length of 2⅜" diameter Schedule 40 steel pipe. The middle spike 40, constructed of solid steel stock, is two inches in diameter and approximately four feet in length. The side spikes 42, 44 are also constructed of two inch diameter solid steel stock and are about one foot in length.

Installation, operation and removal of the hay bale lifter 10 will be understood with reference to FIG. 1, FIG. 2 and FIG. 8, the hay bale lifter 10 is retrieved from a storage facility and is mounted onto a vehicle 22, which may be a pick-up truck or a utility van. The coupling bar 12 is inserted into the tow bar receiver pocket 14 and is locked securely in place by the lock pin 23. The fork assembly 28 is then released from its upright vertical position and rotated by hand until the bearing cup 68 is brought into engagement with the piston rod 62. The pump handle 66 is then stroked, extending the piston rod until the pivot frame weldment 54 is supported substantially in a horizontal impaling position as shown in FIG. 2.

The middle spike 40 is then inserted into the coupling barrel 46 and is locked into its fully inserted position by the lock pin 48. This initial set-up is performed easily by one person in only a few minutes, and requires no tools.

After the initial set-up, the pivot frame 54 and fork assembly 28 are rotated to the vertical travel position as shown in FIG. 5 and FIG. 7. The operator then drives the vehicle 22 onto the field and positions the vehicle by backing it up into broadside impaling alignment with a round hay bale 50. The operator then turns off the vehicle ignition and manually places the pivot frame and fork assembly into contact engagement with the piston rod 62 in its preset position.

The operator then returns to the vehicle and backs it up, thus impaling the center spike 40 and side spikes 42, 44 deeply into the round hay bale 50. The operator once again turns off the vehicle ignition, stands between the vehicle and the hay bale and strokes the pump handle, thus driving the piston rod 62 against the bearing cup 68. In response to each power stroke, the fork assembly 28 is pivoted upwardly about the axle 90, until the pointed end 40A of the center spike 40 is elevated substantially above the hinge end portion 52. As can best be seen in FIG. 8, the load angle for transporting the bale is preferably about forty-five degrees.

The round bale 50 is then transported by the vehicle 20 to an outdoor storage field or to a feeding range. Upon arrival at the new location, the operator turns off the vehicle ignition and slowly bleeds the hydraulic pressure in the power cylinder 60 by opening a relief valve through which the pressurized fluid is returned to the pump reservoir. The hay bale 50 is thus slowly lowered to the ground surface. When the fork assembly 28 is once again in the horizontal resting position, the weight load of the hay bale is removed from the fork assembly 28. The operator then returns to the vehicle and drives it forward, thus extracting the spikes from the bale.

After extraction of the spikes from the hay bale, the operator then manually lifts the fork assembly 28 to the upright travel position as shown in FIG. 7 and locks it into place with the lock pin 90. Optionally, the operator can remove the center spike 40 from the coupling barrel 46 and can remove the hay bale lifter 10 from the tow bar trailer hitch 16. The hay bale lifter 10 and the center spike 40 are placed onto the rear load deck of the vehicle 22.

It will be appreciated that the hand operated hay bale lifter 10 is of a size and weight that can be handled easily by one person during initial set-up, operation and removal from a standard tow bar trailer hitch. Moreover, the fork assembly is pivotally mounted on an upright yoke weldment, thereby positioning the fork assembly directly above the hydraulic cylinder and piston rod. The outboard placement of the hydraulic power cylinder minimizes the shift in the vehicle's center of gravity that is imposed by an impaled load. Since no portion of the hay bale lifter extends below the vehicle axle, dragging damage is avoided. Moreover, since the pump is manually operated, connections to the vehicle hydraulic or electrical systems are not required. The hay bale lifter of the present invention is therefore completely self-contained and is particularly well adapted for use on pick-up trucks and sport utility vehicles.

I claim:

1. Apparatus for impaling and lifting a bale of hay comprising:

a coupling bar constructed for insertion into the receiver pocket of a tow bar trailer hitch;

a fork assembly including an impaling end portion and a hinge end portion supported by the coupling bar for pivotal movement to and from an unloaded resting position in which the impaling end portion extends generally horizontally for impaling a bale of hay, and to and from an inclined position in which the impaling end portion is elevated with respect to the hinge end portion;

a hand operable hydraulic jack assembly including a hydraulic power cylinder and a piston rod supported by the coupling bar;

an open bearing cup or socket mounted on the fork assembly; and, the piston rod including an end portion engagable against the bearing cup for supporting the fork assembly during extension and retraction of the piston rod relative to the power cylinder.

2. Apparatus for impaling and lifting a bale of hay as set forth in claim 1, the piston rod including a ball coupling member; and, the open bearing cup including a hemispherical pocket for receiving the ball coupling member, wherein the cup rotates about the ball as the piston rod extends and retracts.

3. Apparatus for impaling and lifting a bale of hay as set forth in claim 1, including:

a pivot stand mounted on the coupling bar, the fork assembly being mounted on the pivot stand for pivotal movement, and the hydraulic jack assembly being supported by the coupling bar beneath the fork assembly.

4. Apparatus for impaling and lifting a bale of hay as set forth in claim 1, including:

a support stub supported by the coupling bar and projecting outwardly therefrom; and, the hydraulic jack assembly being mounted on the support stub.

5. Apparatus for impaling and lifting a bale of hay as set forth in claim 1, including:

a hand pump coupled to the hydraulic power cylinder, the hand pump including a manually operable pump handle extending transversely with respect to the coupling bar.

6. Apparatus for impaling and lifting a bale of hay as set forth in claim 1, including a pivot stand mounted on the coupling bar, the pivot stand comprising:

a stanchion disposed on the coupling bar and projecting transversely with respect to the coupling bar;

a cross beam attached to the stanchion and projecting generally at a right angle with respect to the coupling bar;

a first end plate and a second end plate attached onto opposite ends of the cross beam;

an axle supported on and extending between the first and second end plates; and, the fork assembly including a cylindrical bearing sleeve coupled for rotation on the axle.

7. Apparatus for impaling and lifting a round bale comprising:

a coupling bar constructed for insertion into the receiver pocket of a trailer hitch;

a pivot stand attached to the coupling bar;

a fork assembly mounted on the pivot stand for pivotal movement to and from a generally horizontal impaling position and to and from an elevated position in which the fork assembly is inclined with respect to the coupling bar;

a support stub attached to the pivot stand and projecting outboard of the pivot stand generally in alignment with the coupling bar; and, a hand operated hydraulic jack assembly mounted on the support stub beneath the fork assembly, the hydraulic jack assembly including a hydraulic power cylinder and a piston rod coupled to the fork assembly.

8. Apparatus for impaling and lifting a round bale as set forth in claim 7, the pivot stand including a yoke weldment comprising:

an upright stanchion disposed between the coupling bar and the support stub;

a cross beam mounted on and attached to the stanchion and extending transversely with respect to the coupling bar;

first and second end plates attached onto opposite ends of the cross beam;

an axle mounted on and extending between the first and second end plates, respectively; and, the fork assembly including a cylindrical bearing sleeve mounted for rotation on the axle.

9. Apparatus for impaling and lifting a round bale as set forth in claim 7, including:

an open bearing cup or socket mounted on the fork assembly; and, the piston rod including an end portion engagable against the bearing cup for supporting the fork assembly during extension and retraction of the piston rod relative to the power cylinder.

10. Apparatus for impaling and lifting a round bale as set forth in claim 9, including:

a ball mounted on the piston rod end portion;

the open bearing cup having a concave pocket; and, the ball being received within the concave pocket, whereby the cup is rotatable about the ball as the piston extends and retracts.

11. Apparatus for impaling and lifting a round bale as set forth in claim 7, the hydraulic jack assembly comprising:

a hand pump coupled to the hydraulic power cylinder and including a handle extending transversely with respect to the coupling bar.

12. Apparatus for impaling and lifting a round bale of hay comprising:

a coupling bar constructed for insertion into the receiver pocket of a tow bar trailer hitch;

a pivot stand attached to the coupling bar;

a support stub attached to the pivot stand and projecting generally in alignment with the coupling bar;

a hand operated hydraulic jack mounted on the support stub, the hydraulic jack including a hydraulic power cylinder and a piston rod that is extendable and retractable relative to the power cylinder; and, a fork assembly mounted on the pivot stand for movement to and from an impaling position in which the fork assembly is supported on the piston rod, and for movement to and from an upright vertical position in which the fork assembly is disengaged from the piston rod.

13. Apparatus for impaling and lifting a round bale as set forth in claim 12, including:

an open bearing cup or socket mounted on the fork assembly; and, the piston rod including an end portion insertable into the bearing cup for supporting the fork assembly during extension and retraction of the piston rod relative to the power cylinder.

14. Apparatus for impaling and lifting a round bale as set forth in claim 13, including:

a ball coupling member mounted on the piston rod end portion;

the cup having a concave coupling pocket; and, the ball coupling member being received in the concave coupling pocket and supporting the bearing cup for rotation about the ball coupling member as the piston rod extends and retracts.

15. Apparatus for impaling and lifting a bale of hay as set forth in claim 12, the pivot stand including:

a stanchion disposed between the coupling bar and the support stub and projecting upright with respect to the coupling bar;

a cross beam mounted onto the stanchion and extending transversely with respect to the coupling bar;

a first end plate and a second end plate attached onto opposite ends of the cross beam, thereby defining a yoke space;

an axle mounted onto the first and second end plates and extending across the yoke space; and, the fork assembly including a cylindrical bearing sleeve disposed in the yoke space and coupled for rotation on the axle.

16. Apparatus for impaling and lifting a bale of hay as set forth in claim 12, the hydraulic jack including a hand pump coupled to the hydraulic power cylinder and a manually operable pump handle coupled to the hand pump, the pump handle extending transversely with respect to the coupling bar.

17. Apparatus for impaling and lifting a round bale of hay comprising:

a coupling bar constructed for insertion into the receiver pocket of a tow bar trailer hitch;

a support stub mounted on the coupling bar and projecting outwardly therefrom; p1 a stanchion disposed between the coupling bar and the support stub and projecting transversely with respect to the coupling bar;

a cross beam attached to the stanchion and projecting generally at a right angle with respect to the coupling bar;

a first end plate and a second end plate attached onto opposite ends of the cross beam thereby defining a yoke;

an axle supported on the yoke and extending between the first and second end plates;

a cylindrical bearing sleeve mounted for rotation on the axle;

a hand operated hydraulic jack assembly mounted on the support stub, the hydraulic jack assembly including a hydraulic power cylinder and a piston rod that is extendable and retractable relative to the power cylinder; and, a fork assembly mounted on the bearing sleeve for pivotal movement between an impaling position and an elevated load position in which the fork assembly is supported on the piston rod.

18. Apparatus for impaling and lifting a round bale as set forth in claim 17, including:

an open bearing cup or socket mounted on the fork assembly; and, the piston rod including an end portion insertable into the bearing cup for supporting the fork assembly during extension and retraction of the piston rod relative to the power cylinder.

19. Apparatus for impaling and lifting a round bale as set forth in claim 18, including:

a ball coupling member attached to the piston rod end portion;

the cup having a concave coupling pocket; and, the ball coupling member being received in the concave coupling pocket and supporting the bearing cup for rotation about the ball coupling member as the piston rod extends and retracts.

20. Apparatus for impaling and lifting a round bale of hay as set forth in claim 17, the hydraulic jack assembly including a hand pump coupled to the power cylinder and a manually operable pump handle coupled to the pump, the pump handle extending transversely with respect to the coupling bar.

* * * * *